United States Patent
Oza et al.

(10) Patent No.: US 11,940,027 B2
(45) Date of Patent: Mar. 26, 2024

(54) AIRCRAFT BRAKE TEMPERATURE CONTROL SYSTEM

(71) Applicant: Airbus Operations Limited, Bristol (GB)

(72) Inventors: Utsav Oza, Bristol (GB); Kurt Bruggemann, Bristol (GB); Rob Hurley, Bristol (GB)

(73) Assignee: Airbus Operations Limited, Bristol (GB)

( * ) Notice: Subject to any disclaimer, the term of this patent is extended or adjusted under 35 U.S.C. 154(b) by 193 days.

(21) Appl. No.: 17/499,416

(22) Filed: Oct. 12, 2021

(65) Prior Publication Data

US 2022/0205502 A1 Jun. 30, 2022

(30) Foreign Application Priority Data

Dec. 10, 2020 (GB) .................................... 2019496

(51) Int. Cl.
*F16D 65/847* (2006.01)
*B60T 5/00* (2006.01)
*B64C 25/42* (2006.01)
*F16D 65/78* (2006.01)

(52) U.S. Cl.
CPC .............. *F16D 65/847* (2013.01); *B60T 5/00* (2013.01); *B64C 25/42* (2013.01); *F16D 2065/783* (2013.01); *F16D 2065/787* (2013.01)

(58) Field of Classification Search
None
See application file for complete search history.

(56) References Cited

U.S. PATENT DOCUMENTS

| 5,655,359 | A | 8/1997 | Campbell et al. |
| 7,757,994 | B2 | 7/2010 | Schrauf |
| 8,191,834 | B2 | 6/2012 | Westenberger et al. |
| 8,528,856 | B2 * | 9/2013 | Charles ............... B64C 25/405 244/50 |
| 2009/0152055 | A1 | 6/2009 | Cox |
| 2015/0097078 | A1 | 4/2015 | Mueller et al. |

(Continued)

FOREIGN PATENT DOCUMENTS

| CN | 109305147 | 2/2019 |
| CN | 109305148 | 2/2019 |
| CN | 109307025 | 2/2019 |

(Continued)

OTHER PUBLICATIONS

European Search Report cited in GB 21203402.9 dated Apr. 7, 2022, 8 pages.

(Continued)

*Primary Examiner* — Melanie Torres Williams
(74) *Attorney, Agent, or Firm* — Nixon & Vanderhye P.C.

(57) ABSTRACT

An aircraft brake temperature control system (BTCS) 100 for controlling a temperature of a brake 220 of a landing gear 201 of the aircraft 200. The BTCS 100 includes a controller 110 configured to cause at least one fluid moving device 230, 231, 232 to drive a flow of fluid onto the brake 220, selectively in one of a plurality of modes, to control the temperature of the brake 220. The BTCS 100 may be incorporated into an aircraft system 1000 with at least one fluid moving device 230, 231, 232, wherein the aircraft system is on an aircraft 200.

17 Claims, 3 Drawing Sheets

(56) References Cited

U.S. PATENT DOCUMENTS

2016/0214720 A1  7/2016  Hara et al.
2016/0356331 A1  12/2016  Bill

FOREIGN PATENT DOCUMENTS

| | | | | |
|---|---|---|---|---|
| CN | 209112157 | 7/2019 | | |
| CN | 209196016 | 8/2019 | | |
| CN | 209258098 | 8/2019 | | |
| CN | 110562443 | 12/2019 | | |
| CN | 110597320 | 12/2019 | | |
| CN | 110901902 | 3/2020 | | |
| CN | 210761277 | 6/2020 | | |
| CN | 211441869 | 9/2020 | | |
| CN | 212074405 | 12/2020 | | |
| DE | 100 28 450 | 4/2002 | | |
| EP | 2 772 428 | 9/2014 | | |
| EP | 2 815 964 | 12/2014 | | |
| EP | 3 048 041 | 7/2016 | | |
| EP | 3 805 060 | 4/2021 | | |
| GB | 2457144 | 8/2009 | | |
| GB | 2533476 A | * | 6/2016 | ............. B60T 17/00 |
| GB | 2539035 | 12/2016 | | |
| RU | 198449 U1 | * | 7/2020 | |

OTHER PUBLICATIONS

Search Report cited in GB2019496.5 dated Nov. 3, 2021, 8 pages.
Combined Search and Examination Report for GB Application No. 2019496.5 dated May 10, 2021, 8 pages.

* cited by examiner

AIRCRAFT BRAKE TEMPERATURE CONTROL SYSTEM

RELATED APPLICATION

This application claims priority to and incorporates entirely by reference United Kingdom patent application GB 2019496-5 filed Dec. 10, 2020.

TECHNICAL FIELD

The present invention relates to an aircraft brake temperature control system.

BACKGROUND

Aircraft braking systems generate heat during normal operating conditions. Increased brake temperatures can lead to increased braking distances, increased wear, and increased turnaround times between flights.

SUMMARY

A first aspect of the present invention provides an aircraft brake temperature control system for controlling a temperature of a brake of a landing gear of an aircraft. The aircraft brake temperature control system comprises a controller that is configured to cause at least one fluid moving device to drive a flow of fluid onto the brake, selectively in one of a plurality of modes, to control the temperature of the brake.

Optionally, the controller is configured to cause the at least one fluid moving device to drive the flow of fluid onto the brake to control the temperature of the brake, on the basis of a condition indicating to the controller that the aircraft is in-flight.

Optionally, the controller is configured to cause the at least one fluid moving device to drive the flow of fluid onto the brake to control the temperature of the brake, on the basis of a determination as to whether the aircraft is in-flight. Optionally, the controller is configured to cause the at least one fluid moving device to drive the flow of fluid onto the brake to control the temperature of the brake, on the basis of a further determination related to at least one of a temporal consideration, a functionality consideration of at least one component of the aircraft, and a noise, vibration and/or harshness (NVH) consideration of the aircraft (such as a noise consideration of the aircraft, a vibration consideration of the aircraft, and a harshness consideration of the aircraft). Optionally, the temporal consideration comprises at least one of a temporal operation of the aircraft and a temporal condition external to the aircraft. Optionally, the temporal operation of the aircraft comprises at least one of a flight duration of the aircraft during a given flight, an interval between successive flights of the aircraft, an elapsed flight duration during a given flight, and a remaining flight duration of the aircraft during a given flight. Optionally, the temporal condition external to the aircraft comprises at least a time of a time zone at a portion or portions of a flight of the aircraft. Optionally, the functionality consideration is related to at least one of a performance consideration and a lifespan consideration. Optionally, the landing gear and/or a landing gear bay comprises the at least one component.

Optionally, the temperature of the brake is a temperature of a braking surface. Optionally, the brake comprises a disc and the disc comprise the braking surface. Optionally the temperature is a temperature detected by a temperature sensor. Optionally the temperature sensor is located on the brake. Optionally the temperature sensor is located off the brake. Optionally the temperature sensor is located on the landing gear. Optionally the temperature sensor is located off the landing gear. Optionally the temperature sensor is located in a landing gear bay of the aircraft. Optionally, the temperature of the brake is a temperature detected by a plurality of temperature sensors.

Optionally, the controller is configured to cause at least one fluid moving device to drive the flow of fluid onto the brake to reduce the temperature of the brake. Optionally, the controller is configured to cause at least one fluid moving device to drive the flow of fluid onto the brake to reduce the temperature of the brake to a target temperature. Optionally, the target temperature is less than 300 degrees Celsius. Optionally, the target temperature is less than 200 degrees Celsius. Optionally, the target temperature is a temperature range. Optionally, the temperature range is 100 to 300 degrees Celsius. Optionally, the temperature range is 100 to 200 degrees Celsius.

Optionally, the controller is configured to cause the at least one fluid moving device to operate in a first mode of the plurality of modes to produce a relatively high flow rate (rate of flow) of the fluid onto the brake, and to operate in a second mode of the plurality of modes to produce a relatively low flow rate (rate of flow) of the fluid onto the brake. Optionally, the first mode is in a first portion of a flight duration and the second mode is in a second portion of the flight duration.

Optionally, a rate of flow of the fluid is a volume flow rate. Optionally, the relatively high rate of flow of the fluid is greater than 100 litres per second. Optionally, the relatively low rate of flow of the fluid is less than or equal to 100 litres per second. Optionally, the relatively high rate of flow of the fluid is between 100 and 300 litres per second. Optionally, the relatively low rate of flow of the fluid is between 20 and 80 litres per second. Optionally, the rate of flow of the fluid is a mass flow rate.

Optionally, the controller is configured to cause the at least one fluid moving device to operate at a first speed in the first mode and at a second speed in the second mode, wherein the first speed is greater than the second speed. Optionally, the at least one fluid moving device is operable with a variable speed and the controller is configured to cause the at least one fluid moving device to operate at a variable speed. Optionally, a rate of flow of the fluid onto the brake is fixed in the first and/or second mode. Optionally, the rate of flow of the fluid onto the brake is variable within a range in the first and/or second mode.

Optionally, the controller is configured to cause the at least one fluid moving device to drive the flow of the fluid onto the brake, on the basis of a condition indicating to the controller that the brake requires cooling.

Optionally, the at least one fluid moving device comprises a fluid moving device that is on or mounted on the landing gear.

Optionally, the at least one fluid moving device comprises a fluid moving device that is off the landing gear. Optionally, the fluid moving device is unattached to the landing gear.

Optionally, the at least one fluid moving device comprises a fluid moving device mounted to a landing gear bay into which the landing gear is retractable. Optionally, the fluid moving device is mounted to a part of the landing gear bay.

Optionally, the at least one fluid moving device comprises plural fluid moving devices and, optionally, the controller is configured to selectively cause each fluid moving device of the plural fluid moving devices to drive a respective flow of fluid onto the brake.

Optionally, the controller is configured to cause an intake of external air into an internal environment comprising the brake and the at least one fluid moving device to cause thermal transfer between the external air and the fluid, wherein the external air is from an external environment that is external to the internal environment. Optionally, the controller is configured to cause the fluid to receive the intake of external air. Optionally, the external environment is an unpressurised region. Optionally, the external environment is external to the aircraft. Optionally, the external environment is within the aircraft. Optionally, the external environment within the aircraft is an environment of an air conditioning or ventilation system of the aircraft.

Optionally, the intake of external air is through an inlet comprising at least one opening. Optionally, the at least one opening is a slot. Optionally, the inlet comprises a plurality of openings. Optionally, at least one opening is located on a fuselage of the aircraft. Optionally, the controller is configured to cause a variation of an extent of the opening of the inlet to vary an intake of the external air.

Optionally, the controller is configured to cause an exhaust of at least a portion of the fluid and/or external air from an internal environment comprising the brake and the at least one fluid moving device.

Optionally, the exhaust of fluid and/or external air is through an outlet comprising at least one opening. Optionally, the at least one opening is a slot. Optionally, the outlet comprises a plurality of openings. Optionally, at least one opening is located on a wing of the aircraft. Optionally, at least one opening is located on a trailing edge of the wing of the aircraft. Optionally, the outlet is located further from the inlet in a longitudinal direction of the aircraft. Optionally, the controller is configured to cause a variation of an extent of the opening of the outlet to vary an exhaust of the fluid and/or external air.

Optionally, the least one fluid moving device comprises a pump and/or a fan. Optionally, the least one fluid moving device is powered by a power source. Optionally, the least one fluid moving device is powered by energy derived by a propulsion system of the aircraft. Optionally, the least one fluid moving device is powered by a battery.

Optionally, the fluid is or comprises a vapour or a gas. Optionally, the fluid is or comprises air.

A second aspect of the present invention provides an aircraft system comprising the aircraft brake temperature control system according to the first aspect and the at least one fluid moving device.

Optionally, the aircraft system comprises a landing gear and a landing gear bay.

Optionally, the aircraft system comprises a first fluid moving device on or mounted on the landing gear and a second fluid moving device that is off the landing gear. Optionally, the second fluid moving device is unattached to the landing gear. Optionally, for every fluid moving device that is on or mounted on the landing gear, the aircraft system comprises two or more fluid moving devices that is off the landing gear. Optionally, a number of the fluid moving devices that are off the landing gear is at least the same as a number of the fluid moving devices that are on or mounted on the landing gear. Optionally, the number of the fluid moving devices that are off the landing gear is at least more than number of the fluid moving devices that are on or mounted on the landing gear.

A third aspect of the present invention provides an aircraft comprising the aircraft brake temperature control system according to the first aspect or the aircraft system according to the second aspect.

A fourth aspect of the present invention provides a method of controlling a temperature of a brake of a landing gear of an aircraft, the method comprising causing at least one fluid moving device to drive a flow of fluid onto the brake, selectively in one of a plurality of modes, to control the temperature of the brake.

Optionally, the causing is on the basis of a condition indicated to the controller that the aircraft is in-flight.

A fifth aspect of the present invention provides a non-transitory computer readable storage medium comprising a set of computer-readable instructions stored thereon, which, when executed by a controller of an aircraft brake temperature control system, cause the controller to cause at least one fluid moving device to drive a flow of fluid onto a brake of a landing gear of an aircraft, selectively in one of a plurality of modes, to control a temperature of the brake.

A sixth aspect of the present invention provides a fluid movement system for moving fluid along a surface of a brake of a wheel of an aircraft. The fluid movement system comprises a controller that is configured to determine an extent of operation of a powered conveyor that is used to move the fluid along the surface of the brake by forced convection of the fluid generated by the powered conveyor, and the controller is configured to cause the powered conveyor to operate on the basis of an indication to the controller as to whether the aircraft is airborne or the aircraft is on the ground.

The aircraft brake temperature control system according to the above aspects of the present invention provides better control of brake temperature of an aircraft, particularly when the aircraft is in-flight. The aircraft brake temperature control system according to the first aspect of the present invention may provide improved brake life and/or brake performance. Alternatively, or additionally, a turnaround time of the aircraft can be reduced when using the aircraft brake temperature control system according to the first aspect of the present invention, as well as a sensitivity to a cumulative brake temperature effect experienced with successive flights during an operation period.

Any optional feature(s) of any one aspect of the present invention may be equally applied to any other aspect(s) of the present invention, where appropriate.

BRIEF DESCRIPTION OF THE DRAWINGS

Embodiments of the invention will now be described, by way of example only, with reference to the accompanying drawings, in which:

FIG. 2b shows a schematic illustration of a front view of the aircraft of FIG. 2a;

DETAILED DESCRIPTION

Figure 1:
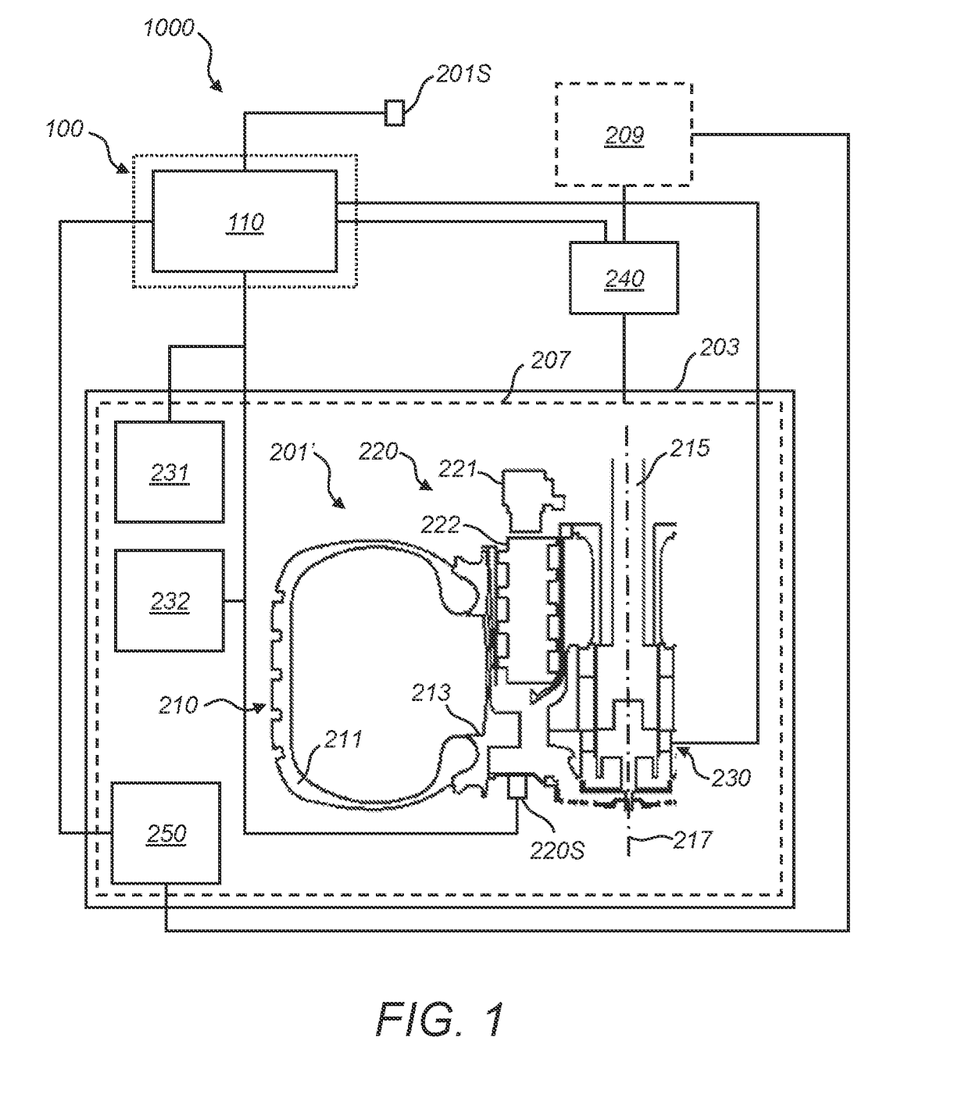
FIG. 1 shows a schematic illustration of an aircraft system according to an embodiment of the present invention.

An aircraft system 1000, according to an embodiment of the present invention, is illustrated schematically in FIG. 1.

In this embodiment, the aircraft system 1000 comprises a landing gear of an aircraft. In FIG. 1, only a portion 201' of the landing gear is shown, and the portion 201' is shown in cross-section. The landing gear comprises a wheel 210, a brake 220, and a brake cooling fan (BCF) 230. The wheel 210 comprises a tyre 211 coupled to a rim 213. The wheel 210 is coupled to an axle 215 and rotates about an axis 217 of the axle 215. In other embodiments, a fluid moving device other than the BCF 230 may be used to drive a fluid (such as air) onto the brake 220 to control the temperature of the brake 220. The BCF 230 is an example of a forced convection device.

In this embodiment, the landing gear is a retractable landing gear. The landing gear is therefore configured to move into and out of a landing gear bay 203 of the aircraft for stowage or deployment of the landing gear, respectively. In FIG. 1, the portion 201' of the landing gear is in the landing bay 203 because the landing gear is in a stowed position. When in the stowed position, the axle 215 is more closely aligned with an up-and-down direction of the aircraft than the axle 215 is aligned with a side-to-side direction of the aircraft. The up-and-down direction is shown in FIG. 2*b* as direction 200*y*. The side-to-side direction is shown in FIG. 2*b* as direction 200*x*.

The brake 220 is for applying a braking force to the wheel 210 of the landing gear to decelerate the aircraft in a deceleration event, for example during a landing procedure of the aircraft. In this embodiment, the braking force causes friction between braking surfaces of parts 221, 222 of the brake 220. The braking surfaces comprise first and second braking surfaces of the brake 220. In other embodiments, there may be plural first braking surfaces and plural second braking surfaces. The first braking surface rotates relative to the second braking surface. Therefore, in this embodiment, the braking force causes friction between a rotating friction surface of the brake 220 and a stationary friction surface of the brake 220. The friction, generated by the braking force, causes a temperature of the brake 220 to increase.

The temperature of the brake 220 can affect an amount of wear of the brake 220, for example when the brake 220 is a carbon brake or a steel brake, and a performance of the brake 220, for example when the brake 220 is a steel brake. Although some heat can improve an operation of the brake 220, an excessive amount of heat can cause deterioration of performance and/or increased wear. In some instances, brake wear is proportional to brake temperature in a first temperature range. In some instances, brake performance is inversely proportional to brake temperature in a second temperature range. It is therefore desirable to control the temperature of the brake 220 to manage brake wear and brake performance.

There are many safety considerations when operating an aircraft. Adequate operation of the brake 220 of the aircraft is an example of such a safety consideration. When the aircraft is on the ground, for example between successive flights, the aircraft may be required to remain grounded when the temperature of the brake 220 exceeds a maximum allowable temperature. When the temperature of the brake 220 is acceptable, with respect to the maximum allowable temperature, the brake 220 may be considered acceptable for performing in a future braking event and the aircraft may then be allowed to take-off from a runway. When the aircraft is airborne and is due to land, the aircraft will be required to stop safely in a limited distance related to a length of the runway. When the temperature of the brake 220, such as a steel brake, is higher than normal, a stopping distance or a stopping power will likely be higher than a normal stopping distance.

In addition to the above safety considerations, there are many duty cycle considerations when operating an aircraft. An example of a duty cycle consideration is a so-called turnaround time of the aircraft. The turnaround time of the aircraft is an example of a temporal operation of the aircraft. The temporal operation of the aircraft is a temporal condition. Another example of a temporal condition includes a temporal condition external to the aircraft, such as a time of a time zone at a portion or portions of a flight of the aircraft.

The turnaround time of the aircraft can be considered as a period of time that the aircraft is on the ground between successive flights. The period of time can be considered as the total amount of time from touchdown to takeoff. A turnaround time of the aircraft may be required to be extended by a temperature of the brake 220 if the temperature of the brake 220 is too high. Another example of a duty cycle consideration is a flight duration of the aircraft. The flight duration can be considered the time from takeoff to touchdown. The flight duration is another example of a temporal operation of the aircraft. Other examples include an elapsed flight duration during a flight, and a remaining flight duration of the aircraft during a flight.

A temperature of the brake 220 before touchdown may be related to the flight duration. In general, the longer the flight, the longer the time for the brake 220 to cool. Nevertheless, it may be desirable for the brake 220 to operate in a temperature window and the flight duration, whether a long or a short flight duration, may affect where the temperature of the brake 220 is with respect to the temperature window. Controlling the temperature of the brake 220 is therefore advantageous.

The aircraft system 1000 comprises an aircraft brake temperature control system (BTCS) 100. The BTCS 100 comprises a controller 110 for controlling a temperature of the brake 220. The BTCS 100 is operational when the aircraft is in-flight. The BTCS 100 is also operational when the aircraft is on the ground. Control of the temperature of the brake 220, particularly when the aircraft is airborne, is advantageous in view of the above safety and duty cycle considerations. For example, the BTCS 100 enables the turnaround time of the aircraft to be reduced and brake performance or brake wear to be less impacted by flight time.

The controller 110 is configured to cause at least the BCF 230 to drive a flow of air onto the brake 220 to control the temperature of the brake 220. In other embodiments, a fluid other than air may be driven onto the brake 220 to control the temperature of the brake 220. The controller 110 is configured to output a signal to the BCF 230 to affect an operation of the BCF 230 and thus the flow of air interacting with the brake 220. The BCF 230 thus generates a forced convection of the air to influence a temperature of the brake 220, for example by allowing the movement of air to remove heat from the brake 220.

In this embodiment, the controller 110 is configured to cause at least the BCF 230 to drive the flow of air onto the brake to control the temperature of the brake, on the basis of a condition indicating to the controller 110 that the aircraft is in-flight. The condition is based on detection of an event by a sensor. In this embodiment, the condition is a "weight-off" condition resulting from detection, by a sensor 2015, of a change in a length of a telescopic strut of the landing gear. The "weight-off" detection indicates that the aircraft is no longer on the ground and is airborne.

In other embodiments, the sensor may be a pressure sensor, and the "weight-off" condition may result from a detection, by the pressure sensor, of a change of pressure on the landing gear 201 following take-off. In other embodiments, the pressure sensor may detect a specific pressure or a relative pressure. Other example conditions include a detection of a specific value, a relative value, or a change of value of one of the following: a load, a time, an altitude, an atmospheric pressure, an atmospheric temperature, an aircraft speed (for example, an indicated or true airspeed), a position (for example, of a landing gear or a portion of the landing gear (for example, a suspension component such as a strut), or a landing gear door or a portion of the landing gear).

The controller 110 is configured to cause at least the BCF 230 to operate, selectively in one of a plurality of modes. The controller 110 is configured to receive the selection. In some embodiments, the controller 110 may make the selection; for example, the controller 110 may make the selection on the basis of data indicating whether the aircraft is in-flight or whether the aircraft is on the ground. The selection can be made on locally on the aircraft (for example, by the pilot) or from an external source that is remote from the aircraft (for example, by an operator in a control centre). The selection can also be manual or automatic.

In this example, the controller 110 is configured to cause at least the BCF 230 to operate in a first mode and a second mode. The first mode is to produce a relatively high rate of flow of the air onto the brake 220. The second mode is to produce a relatively low rate of flow of the air onto the brake 220. In this embodiment, the first mode is a first speed of the BCF 230, and the second mode is a second speed of the BCF 230. The first speed is greater than the second speed. The BCF 230 comprises fan blades that rotate about an axle. The speed of the BCF 230 is rotational speed of the axle.

By way of example, the BCF 230 produces a rate of flow of 250 litres per second in the first mode and a rate of flow of 40 litres per second in the second mode. The relatively high rate of flow of the air in the first mode enables the first mode to pass air onto the brake 220 more quickly than the second mode passes air onto the brake 220. The reduced flow of the air in the second mode enables the second mode to be a quieter mode of operation than the first mode. This reduces an amount of noise that is transmitted by operation of the BCF 230 to a cabin of the aircraft when operating in the second mode compared to the first mode. For example, when a portion of a flight is in a period of natural darkness with significantly reduced daylight, such as nighttime, there may be a requirement to keep noise to a minimum while passengers relax or sleep during that portion of the flight. The reduced flow of the air in the second mode can also enable reduced vibrations and/or harshness levels in the aircraft, and specifically those levels felt in the cabin by cargo and/or passengers. Therefore, operating the aircraft system 1000 with a consideration of at least one temporal condition improves a flight experience for those onboard.

The BCF 230 is switchable between the first mode and the second mode. The controller 110 is configured to cause a switch of the BCF 230 to operate between the first mode and the second mode. The controller 110 is configured to cause the switch depending on a condition indicated to the controller 110. In this aircraft system 1000, the condition indicated to the controller 110 is a temperature of a temperature sensor 220S mounted on the landing gear. The temperature sensor 220S provides an indication of a brake temperature and is an example of an aircraft condition. When the temperature sensor 220S indicates to the controller 110 that a temperature is different from a desired temperature or is outside of a desired temperature range, the controller 110 is configured to cause the BCF 230 to drive the flow of the air onto the brake 220. For example, if the temperature of the temperature sensor 220S is greater than the desired temperature or desired temperature range, the controller 110 is configured to cause the BCF 230 to drive the flow of the air onto the brake 220. The controller 110 further determines whether the first mode or the second mode of the BCF 230 is needed, dependent on the temperature of the temperature sensor 220S with respect to the desired temperature or desired temperature range. The determination by the controller 110 can be dependent on flight conditions, such as a remaining flight duration.

An internal environment 207 is provided in the aircraft system 1000. The internal environment 207 comprises the brake 220 and the BCF 230. The internal environment 207 is a space comprising the air that is driven by the BCF 230 onto the brake 220 to control the temperature of the brake 220. The internal environment 207 is a sealed environment of the landing gear bay 203. The sealed environment is achieved by sealing the landing gear bay 203 by closure of a landing gear door using a non-hermetic seal. In other embodiments, the sealed environment may be achieved using a hermetic seal. The internal environment 207 is separated from an external environment 209. The external environment 209 is external to the internal environment 207. In this example, the external environment 209 is the environment external to the aircraft.

The aircraft system 1000 comprises an inlet 240 and an outlet 250. The inlet 240 is located on a forward position of the aircraft, such as a forward position of a fuselage of the aircraft. The outlet 250 is located on a rearward position of the aircraft, such as a trailing edge of a wing of the aircraft. The inlet 240 and outlet 250 each comprise an opening through which air can flow. The openings are vents. The vents are controllable. The inlet 240 and outlet 250 can be open or closed, or partially opened. The controller 110 is configured to cause an extent of opening of the inlet 240 and/or outlet 250 to open and close the inlet 240 and/or outlet 250.

Fluidic communication is provided between the internal environment 207 and the external environment 209 when the inlet 240 is opened. The controller 110 is configured to cause the inlet 240 to open and close to control an intake of external air from the external environment 209 into the internal environment 207. The controller 110 is configured to cause the inlet 240 to open and close based on an indication to the controller 110 that the brake 220 requires cooling. When the aircraft is in-flight and a temperature of the external air is lower than a temperature inside the landing gear bay 203, for example when the external air is ambient air, an intake of the external air will further assist in the cooling of the brake 220. The controller 110 is configured to determine whether the inlet 240 is to be opened or closed based on an aircraft condition or a flight condition. An example aircraft condition is as a temperature of the landing gear indicated by the temperature sensor 220S. An example flight condition is a remaining duration of a flight of the aircraft.

Fluidic communication is further provided between the internal environment 207 and the external environment 209 when the outlet 250 is opened. The controller 110 is configured to cause the outlet 250 to open and close to control an exhaust of air from the internal environment 207 to the external environment 209. The controller 110 is configured to cause the outlet 250 to open and close based on an aircraft condition or a flight condition. An example aircraft condition is as a temperature of the landing gear indicated by the temperature sensor 220S or a state of the inlet 240 (for example, whether the inlet 240 is open or closed). An example flight condition is a remaining duration of a flight of the aircraft. In-flight, a pressure of the air in the external environment 209 at the outlet 250 is lower than a pressure of the air in the external environment 209 at the inlet 240. Such a difference in pressure will allow passive suction of a boundary layer of the aircraft, such as a boundary layer of the fuselage in which the inlet 240 is placed. This allows the external air to be provided without driving the external air into the internal environment 207.

The aircraft system 1000 further comprises a first auxiliary fan 231 and a second auxiliary fan 232. The first and second auxiliary fans 231, 232 are configured to drive a flow of air onto the brake 220 to control the temperature of the brake 220. The first and second auxiliary fans 231, 232 are off the landing gear and mounted in the landing gear bay 203. Each of the BCF 230, the first auxiliary fan 231 and the second auxiliary fan 232 is an example of a fluid moving device. The fluid moving device may be referred to as a powered conveyor or a blower. The powered conveyor or blower is used to move fluid, such as the air, along the surface of the brake 220 by forced convection of the air generated by the powered conveyor or blower, on the basis of an indication to the controller 110 that the aircraft is airborne or the aircraft is on the ground.

The first and second auxiliary fans 231, 232 can supplement the flow or air driven by the BCF 230. Each of the BCF 230 can be operated independently or in any possible combination. For example, at least one of the BCF 230, the first auxiliary fan 231, and the second auxiliary fan 232 is operable alone or in combination with at least one other of the BCF 230, the first auxiliary fan 231, and the second auxiliary fan 232. The controller 110 is configured to selectively cause each of the fluid moving devices to drive the flow of the air onto the brake 220.

The first and second auxiliary fans 231, 232 assist with a circulation of the air within the landing gear bay 203. This improves heat distribution and reduces an exposure of surfaces near to the brakes to high temperatures. The first and second auxiliary fans 231, 232 therefore drive a flow of the air at a flow rate that is less than or equal to a flow of the air driven by the BCF 230. The first and second auxiliary fans 231, 232 are distributed around a periphery of the landing gear bay 203. The distribution of the first and second auxiliary fans 231, 232 enables improved control of the circulation of air within the landing gear bay 203. A direction of flow from each of the first and second auxiliary fans 231, 232 complements a direction of circulation of the air. For example, the first and second auxiliary fans 231, 232 operate to flow the air in the same or similar direction. In some embodiments, at least one of the first auxiliary fan 231 and the second auxiliary fan 232 may be omitted.

Figure 2A:
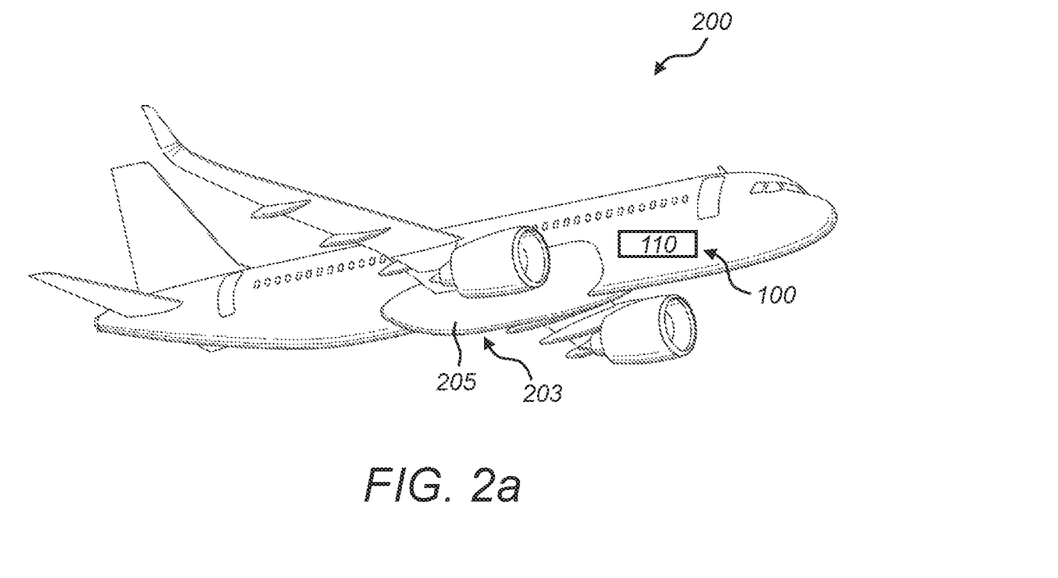
FIG. 2a shows a schematic illustration of a perspective view of an aircraft comprising the aircraft system of FIG. 1.
Figure 2B:
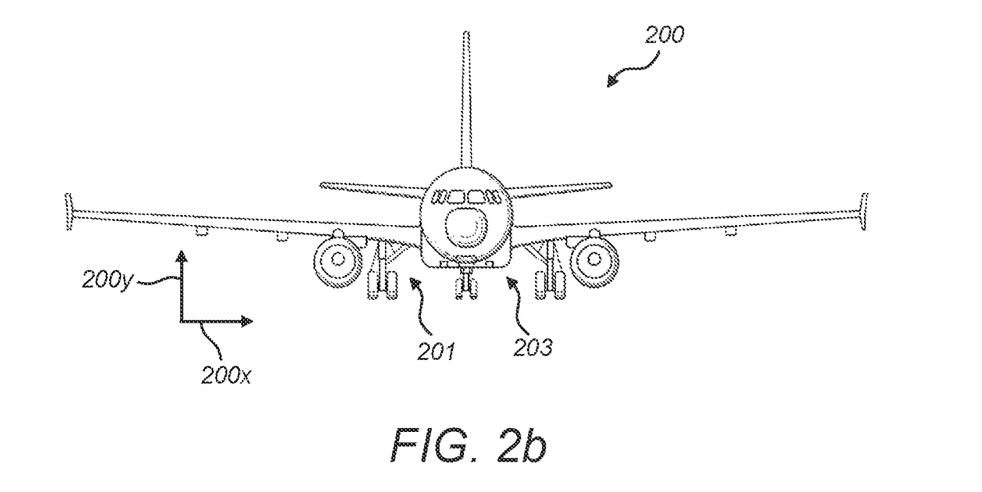

An aircraft 200 according to an embodiment of the present invention is illustrated schematically in FIGS. 2a and 2b. In this embodiment, the aircraft 200 comprises the BTCS 100 shown in FIG. 1. The aircraft 200 comprises a landing gear 201, a landing gear bay 203, and a landing gear door 205. A portion of the landing gear 201 is represented by the portion 201' of FIG. 1. The landing gear 201 is retractable into the landing gear bay 203 and is closed from an outside of the aircraft 200 during flight of the aircraft 200 by the landing gear door 205. That is, when the landing gear 201 is stowed in the landing gear bay 203, the landing gear 201 and the landing gear bay 203 is closed from an external environment by the landing gear door 205.

Figure 3:
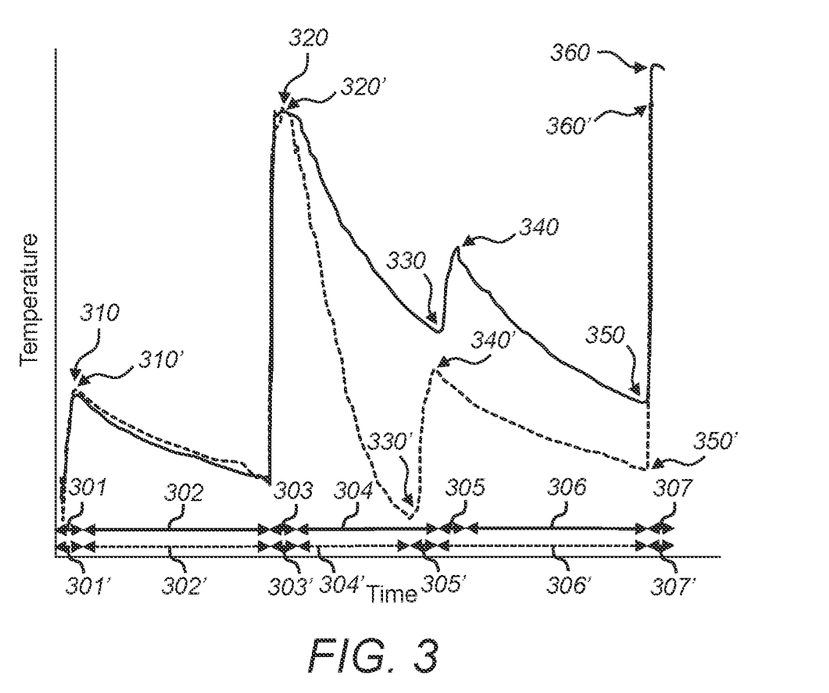
FIG. 3 shows an example plot of data obtained from a simulation of the aircraft system of FIG. 1.

FIG. 3 shows an example plot of data obtained from a simulation of the aircraft system 1000 of FIG. 1. The plot of data is a plot of temperature on the y-axis with respect to time on the x-axis. The plot of data shows a variation of temperature, indicated by the temperature sensor 220S for example, during operation of the aircraft 200 for a first operation period and a second operation period.

In this example, the solid line on the plot of data represents the first operation period when the BCF 230 is not utilised by the aircraft 200. The dashed line on the plot of data represents the second operation period when the BCF 230 is utilised by the aircraft 200. The plot of data for the first and second operation periods are overlaid so that a direct comparison can be made.

The first and second operation periods successively comprise: a first taxiing-out event 301, 301' (comprising a minor braking event), a first flight event 302, 302', a first landing event 303, 303' (comprising a major braking event), a first taxiing-in event 304, 304', a second taxiing-out event 305, 305' (comprising a minor braking event), a second flight event 306, 306', and a second landing event 307, 307' (comprising a major braking event). Each previously described event of the first operation period is shown by solid arrow lines on the plot of data, whereas each previously described event of the second operation period is shown by dashed arrow lines on the plot of data.

A general observation of the plot of data is that simulated temperatures of the temperature sensor 220S when the BCF 230 is utilised in the second operation period (shown by the dashed line) are less than, or substantially equal to, temperatures of the temperature sensor 220S when the BCF 230 is not utilised (shown by the solid line). The largest differences are shown between a second temperature 320, 320' at an end of the first landing event 303, 303' and a fifth temperature 350, 350' at a start of the second landing event 307, 307'. This demonstrates that utilisation of the BCF 230 in-flight of the aircraft helps to reduce temperatures of the brake 220, as detected by the temperature sensor 220S. This enables a turnaround time of the aircraft, between successive flights, to be reduced and enables the brake 220 to perform in a desired operating window.

During the first taxiing-out event 301, 301', the first flight event 302, 302' and the first landing event 303, 303', the BCF 230 is not utilized in either of the first and second operation periods because the brake temperature is already within an acceptable range. This is represented by temperatures of the first and second operation periods being substantially the same because the solid and dashed lines are directly overlaid. In these three successive events there are two peak temperatures. One peak temperature is a first temperature 310, 310', that is experienced at the end of the first taxiing-out event 301, 301', and another peak temperature is a second temperature 320, 320', that is experienced when the aircraft 200 is at the end of the first landing event 303, 303'.

During the first landing event 303, 303', the brake 220 is applied and the temperature of the brake 220 is dramatically increased in both of the first and second operation periods. Following the first landing event 303, 303', the BCF 230 is utilized in the second operation period (shown by the dashed line); however, as mentioned above, the BCF 230 is not utilized in the first operation period (shown by the solid line). This results in significantly different brake temperatures in the first taxiing-in event 304, 304', the second taxiing-out event 305, 305' and the second flight event 306, 306'.

During the first taxiing-in event 304, 304' and the second taxiing-out event 305, 305', the BCF 230 is operated in the first mode with an increased air flow compared to the second mode, as previously described. The brake temperature is reduced to a third temperature 330, 330' at the end of the first taxiing-in event 304, 304' in both the first and second operation periods. However, a greater reduction of the brake temperature is experienced in the second operation period with the BCF 230 utilized, compared to a reduction of the brake temperature experienced in the first operation period with the BCF 230 not utilized. This enables a fourth temperature 340' of the brake 220, at the end of the second taxiing-out event 305', to be more equal to the first temperature 310' of the brake 220, at the end of the first taxiing-out event 301', when in the second operation period with the BCF 230 utilized, compared to the first operation period. In contrast, without utilization of the BCF 230 in the first operation period, a fourth temperature 340 of the brake 220, at the end of the second taxiing-out event 305, is substantially greater than the first temperature 310 of the brake 220 at the end of the first taxiing-out event 301. Advantageously, the second flight event 306' is able to begin earlier for the second operation period, utilizing the BCF 230, compared to the first operating period not utilizing the BCF 230. This demonstrates how the use of the BCF 230 reduces the sensitivity to a cumulative brake temperature effect experienced with successive flights during an operation period.

The advantage of utilizing the BCF 230 in-flight is shown in a comparison of the second flight events 306, 306'. In-flight, the BCF 230, is operated in the second mode with a reduced air flow compared to the first mode, as previously described. This helps to reduce unwanted noise to the cabin because noise produced by the BCF 230 in the second mode is lower than noise produced by the BCF 230 in the first mode. This also helps reduce vibrations and/or harshness in the aircraft, and specifically vibrations and/or harshness levels experienced in the cabin. As seen with the first flight event 302, 302', the temperature of the brake 220 reduces with time in-flight for both the first and second operation periods. However, a fifth temperature 350' of the second operation period, utilizing the BCF 230 in-flight, is significantly lower than a fifth temperature 350 of the second operation period not utilizing the BCF 230 in-flight. The lower fifth temperature 350' enables a sixth brake temperature 360' at the end the second landing event 307' to be lower in the second operation period, utilizing the BCF 230, than a sixth brake temperature 360 at the end of the second landing event 307 in the first operation period not utilizing the BCF 230.

Reducing the brake temperature in-flight, using the BCF 230, therefore enables peak brake temperatures experienced during landing of the aircraft 200 to be reduced. This can help to improve brake performance, reduce brake wear (due to reduced oxidation, which reduces downtime due to maintenance or replacement of parts), and reduce turn-around time (which in turn allows for more flights per day). The use of the BCF 230 also reduces the sensitivity to a cumulative brake temperature effect experienced with successive flights during an operation period.

Better control of brake temperature, and further improvements and reductions, can be achieved from other aspects of the aircraft system 1000 shown in the embodiment of FIG. 1. For example, the intake of external air from an external environment 209 and the supplementation of the air flow by first and second auxiliary fans 231, 231 can provide benefits.

Figure 4:
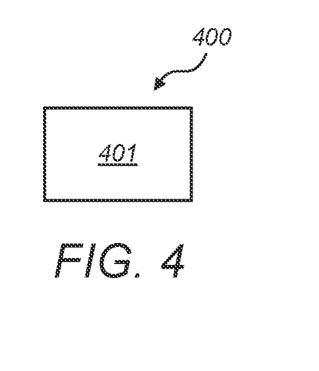
FIG. 4 is a diagram illustrating a method according to an embodiment of the present invention.

A diagram illustrating a method 400 according to an embodiment of the present invention is shown in FIG. 4. In this embodiment, the method 400 is a method of controlling a temperature of a brake of a landing gear of an aircraft. An example brake is the brake 220 described above. The method comprises causing 401 at least one fluid moving device to drive a flow of the fluid, such as air, onto the brake, selectively in one of a plurality of modes, to control the temperature of the brake. Optionally, the causing 401 is on the basis of a condition indicating that the aircraft is in-flight. Examples of at least one fluid moving device includes the BCF 230, and the first and second auxiliary fans 231, 232 described above.

Figure 5:
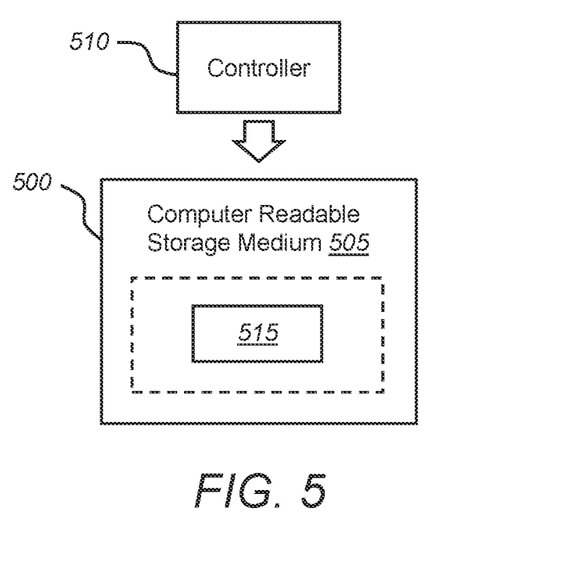
FIG. 5 is a schematic illustration of a set of computer readable instructions within a non-transitory computer-readable storage medium according to an embodiment of the present invention.

A schematic illustration of a set of computer readable instructions within a non-transitory computer-readable storage medium according to an embodiment of the present invention is shown in FIG. 5. The set of computer readable instructions are executed by a controller of an aircraft brake temperature control system, for example the controller 110 of the BTCS 100 described above. When executed, the instructions cause the controller to cause 515 at least one fluid moving device to drive a flow of fluid, such as air, onto a brake of a landing gear of an aircraft, selectively in one of a plurality of modes, to control a temperature of the brake. Optionally, the instructions cause the controller to cause 515 at least one fluid moving device to drive a flow of fluid, on the basis of a condition indicating that the aircraft is in-flight. An example brake is the brake 220 described above. Examples of at least one fluid moving device includes the BCF 230, and the first and second auxiliary fans 231, 232 described above.

In some embodiments, the brake is a hydraulically-actuated brake. In some embodiments, the hydraulically-actuated brake comprises a hydraulic piston. In other embodiments, the brake is an electric brake. In some embodiments, the electric brake comprises electromechanical actuators. In some embodiments, the brake comprises a non-metallic material. In some embodiments, the non-metallic material comprises carbon, and the brake can be referred to as a carbon brake. In some embodiments, the brake comprises a metal. In some embodiments, the metal comprises steel, and the brake can be referred to as a steel brake.

In some embodiments, the brake is configured to hold the aircraft stationary, for example on a runway, as well as to decelerate the aircraft.

In the embodiment shown in FIG. 1, two auxiliary fluid moving devices 231, 232 are shown. In other embodiments, a different number of auxiliary fluid moving devices may be used. For example, a single auxiliary fluid moving device may be used, or none at all. The number of auxiliary fluid moving devices may be equal to or greater than a number of brake cooling fans.

Advantageously, features of the embodiments described herein provide an aircraft system that provides better control of brake temperature. Advantageously, brake performance, brake life, tyre performance, tyre life can be improved. Alternatively, or additionally, a turnaround time of the aircraft can be reduced, as well as a sensitivity to a cumulative brake temperature effect experienced with successive flights during an operation period. Furthermore, reduced brake temperatures assist in reducing exposure to other components of the aircraft to high temperatures. Example components include a wheel, a tyre, a braking housing, a rim of a wheel, an axle of a wheel. Control of brake temperature can help to mitigate a risk of tyre deflation.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention is:

1. An aircraft brake temperature control system for controlling a temperature of a brake of a landing gear of an aircraft, the aircraft brake temperature control system comprising:
  a controller configured to cause at least one fluid moving device to drive a flow of fluid onto the brake, selectively in one of a plurality of modes, to control the temperature of the brake, wherein in at least one of the modes the at least one fluid moving device drives the flow of fluid onto the brake while the aircraft is airborne.

2. The aircraft brake temperature control system according to claim 1, wherein the controller is configured to cause the at least one fluid moving device to operate in a first mode of the plurality of modes to produce a high flow rate of the fluid onto the brake while the aircraft is airborne, and to operate in a second mode of the plurality of modes to produce a low flow rate of the fluid onto the brake while the aircraft is airborne.

3. The aircraft brake temperature control system according to claim 2, wherein the controller is configured to cause the at least one fluid moving device to operate at a first speed in the first mode and at a second speed in the second mode, wherein the first speed is greater than the second speed.

4. The aircraft brake temperature control system according to claim 1, wherein the controller is configured to cause the at least one fluid moving device to drive the flow of the fluid onto the brake on the basis of a condition indicating to the controller that the brake requires cooling.

5. The aircraft brake temperature control system according to claim 1, wherein the at least one fluid moving device comprises a fluid moving device on the landing gear.

6. The aircraft brake temperature control system according to claim 1, wherein the at least one fluid moving device comprises a fluid moving device off the landing gear.

7. The aircraft brake temperature control system according to claim 1, wherein the at least one fluid moving device comprises a fluid moving device mounted to a landing gear bay into which the landing gear is retractable.

8. The aircraft brake temperature control system according to claim 1, wherein the at least one fluid moving device comprises plural fluid moving devices.

9. The aircraft brake temperature control system according to claim 8, wherein the controller is configured to selectively cause each fluid moving device of the plural fluid moving devices to drive a respective flow of fluid onto the brake.

10. The aircraft brake temperature control system according to claim 1, wherein the controller is configured to cause an intake of external air into an internal environment comprising the brake and the at least one fluid moving device to cause thermal transfer between the external air and the fluid, wherein the external air is from an external environment external to the internal environment.

11. The aircraft brake temperature control system according to claim 1, wherein the controller is configured to cause an exhaust of at least a portion of the fluid and/or external air from an internal environment comprising the brake and the at least one fluid moving device.

12. An aircraft system comprising the aircraft brake temperature control system according to claim 1 and the at least one fluid moving device.

13. An aircraft comprising the aircraft system according to claim 12.

14. A method of controlling a temperature of a brake of a landing gear of an aircraft, the method comprising:
  causing at least one fluid moving device to drive a flow of fluid onto the brake, selectively in one of a plurality of modes to control the temperature of the brake,
  wherein the causing, in at least one of the plurality of modes, is performed to cause the flow of the at least one fluid onto the brake while the aircraft is airborne.

15. A non-transitory computer readable storage medium comprising a set of computer-readable instructions stored thereon, which, when executed by a controller of an aircraft brake temperature control system for an aircraft, cause the controller to cause at least one fluid moving device to drive a flow of fluid onto a brake of a landing gear of an aircraft, while the aircraft is airborne, to control a temperature of the brake.

16. A fluid movement system for moving fluid along a surface of a brake of a wheel of an aircraft, the fluid movement system comprising:
  a controller configured to determine an extent of operation of a powered conveyor that moves the fluid along the surface of the brake by forced convection of the fluid generated by the powered conveyor,
  wherein the controller is configured to cause the powered conveyor to move the fluid along the surface of the brake while the aircraft is airborne.

17. The aircraft brake temperature control system of claim 1, wherein the controller is further configured to receive a signal from a sensor indicative of whether the aircraft is airborne, determine that the aircraft is airborne based on the signal, and cause the at least one fluid moving device to drive the flow of fluid onto the brake in response to determining that the aircraft is airborne.

* * * * *